C. W. SIEMENS.
PROCESS OF CONVERTING CAST IRON INTO CAST STEEL.
No. 189,273. Patented April 3, 1877.
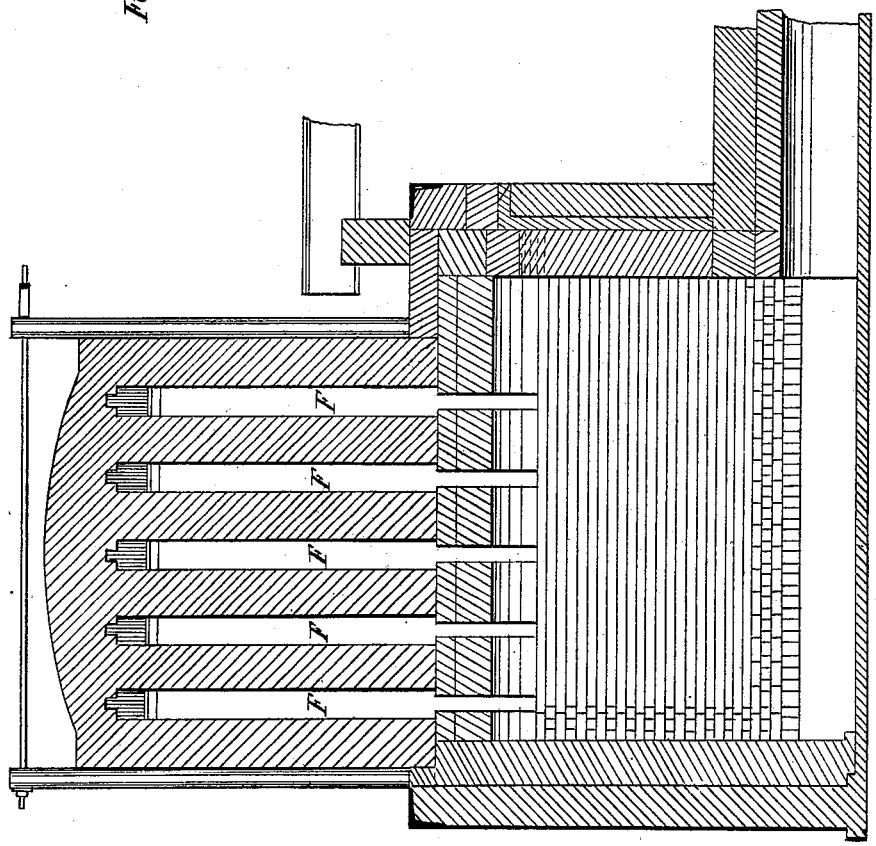

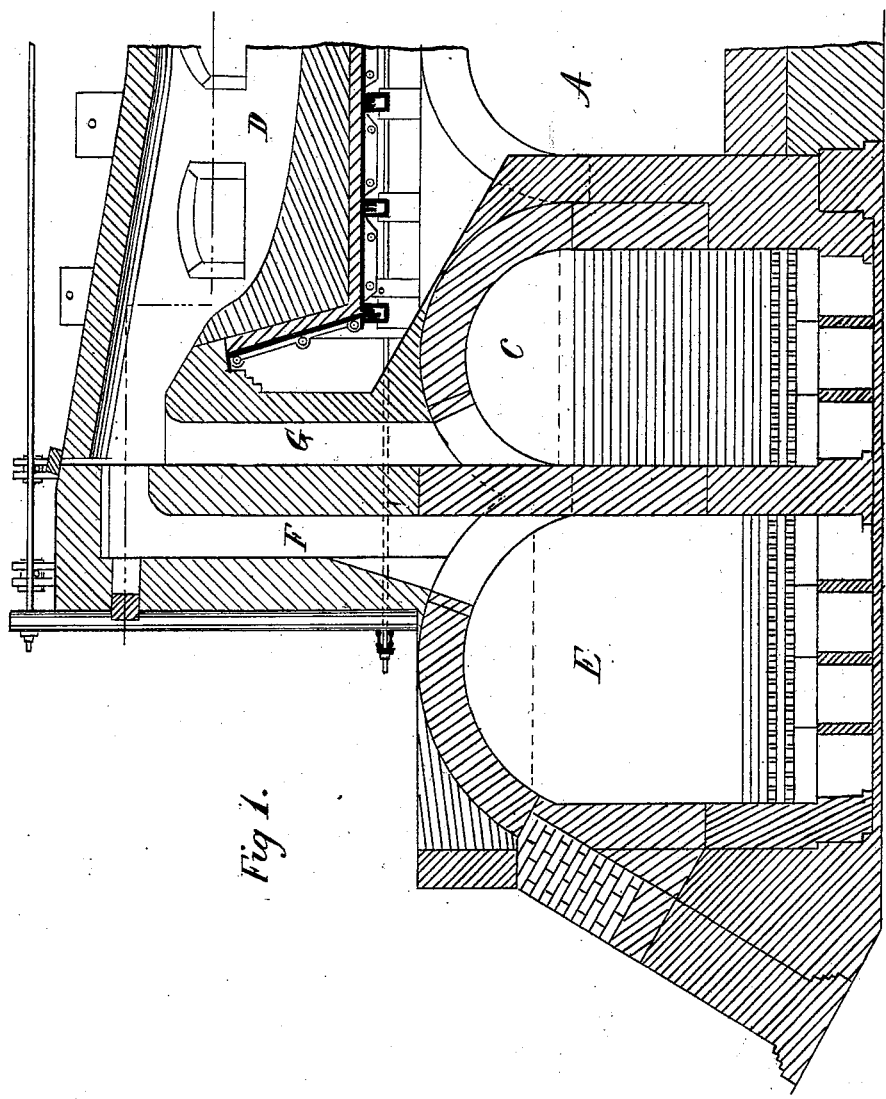

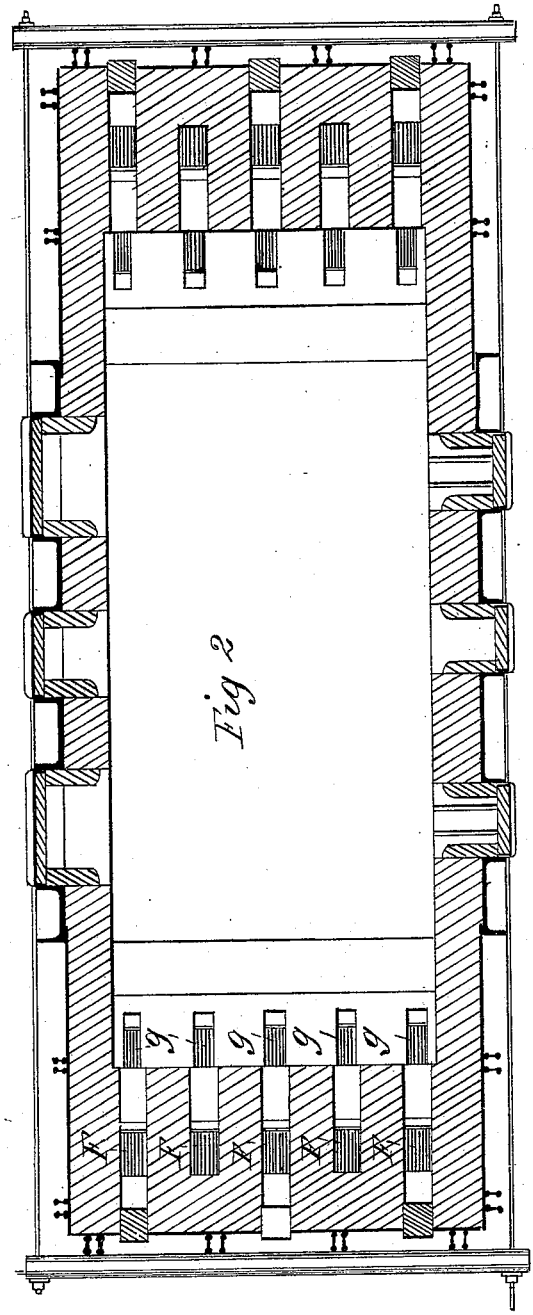

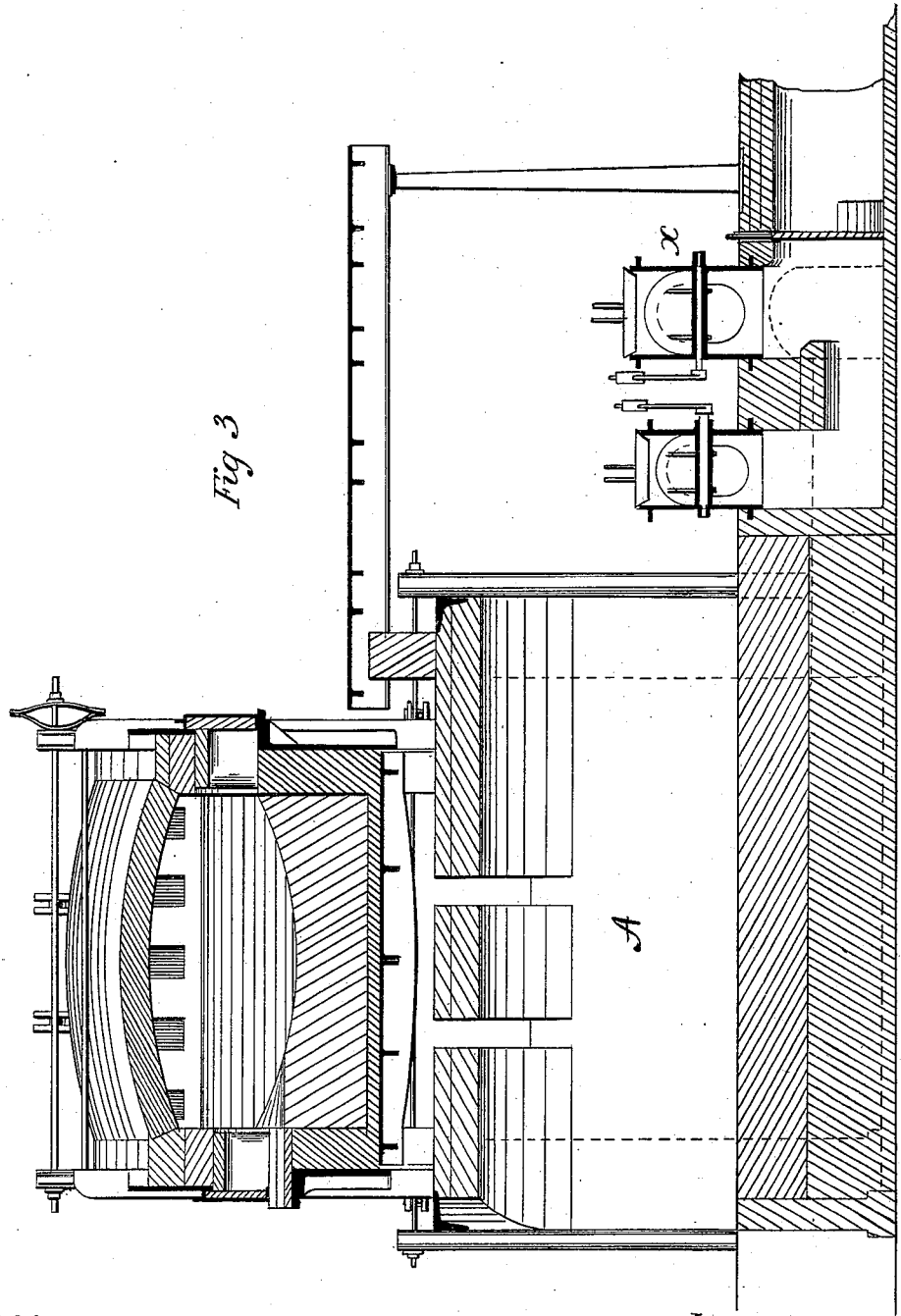

C. W. SIEMENS.
PROCESS OF CONVERTING CAST IRON INTO CAST STEEL.
No. 189,273. Patented April 3, 1877.
5 Sheets—Sheet 5.
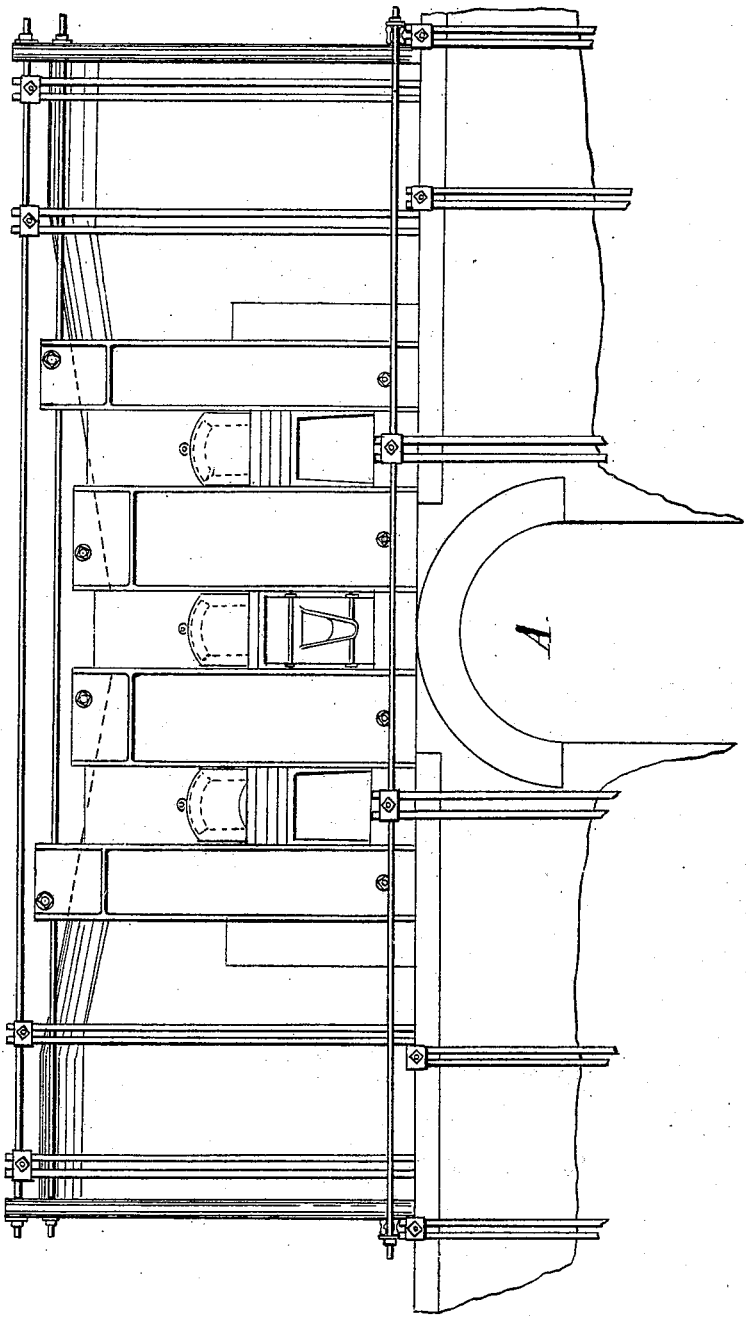

UNITED STATES PATENT OFFICE.

CHARLES WILLIAM SIEMENS, OF WESTMINSTER, ENGLAND.

IMPROVEMENT IN PROCESSES OF CONVERTING CAST-IRON INTO CAST-STEEL.

Specification forming part of Letters Patent No. 189,273, dated April 3, 1877; application filed November 15, 1876.

*To all whom it may concern:*

Be it known that I, CHARLES WILLIAM SIEMENS, of Westminster, county of Middlesex, England, have invented certain Improvements in Process of Converting Cast-Iron into Cast-Steel.

The following description, taken in connection with the accompanying plate of drawings, hereinafter referred to, forms a full and exact specification, wherein are set forth the nature and principles of my invention, together with such parts thereof as I claim as new and desire to secure by Letters Patent of the United States.

My invention relates to the methods and means made use of for converting cast-iron into cast-steel; and the nature thereof consists in pouring, tapping, or otherwise conveying the furnace-charge into a heated ladle lined with refractory material, and containing rich ferro-manganese in a solid condition, and thereby preventing the ferro-manganese from oxidizing, and insuring a definite proportion of manganese in the metal produced.

My improvements may be applied to various processes now in use for refining cast-iron, and therefore I do not confine myself to the particular means and methods of decarbonization hereinafter set forth, but merely describe them, in order to illustrate the applications of my invention.

When my improved methods are applied to the regenerative gas-furnace, a bath of cast or pig iron is first brought to a high temperature by the action of the flame. Upon the bath thus heated either ore, puddled steel, scrap-iron, or old rails, may be thrown, charged, or otherwise introduced. When ore is thus used it may be previously cemented and roasted before being charged into the bath. When it is intended to convert old iron, or steel rails, or other scrap metal into cast-steel, I prefer to charge into the furnace, say, about three tons of scrap, intermixed with two tons of comparatively pure pig metal, and to continue firing until the whole charge has become a fluid mass. The degree to which the bath has been refined is determined by drawing out and examining a sample of the bath, and more scrap metal, or metallic oxide, or ore is added until the samples show the requisite percentage of carbon, when the whole is discharged into a heated ladle containing ferro-manganese, as hereinafter described.

The scoria floating on the metallic bath is run off continuously, or at suitable intervals, during the process of decarburization without discharging the metal itself, and for this purpose the doors or openings of the furnace should be made low enough to suit the lowest possible surface-level of the metallic bath, and rendered capable of being banked up readily by means of sand or other refractory material to the height required. By thus removing the slag from the metal either continuously or at certain intervals during the decarburization of the pig-metal forming the metallic bath, two important advantages are obtained, viz: the process of decarburization is accelerated, in consequence of the more direct access of the flame to the surface of the metal, and the quality of the metal is improved, because the slag, which, at comparatively low temperatures, takes up a considerable proportion of the sulphur and phosphorus originally contained in the materials employed, yields back these impurities to the metal as the higher temperatures of mild steel are approached, so that it is very important to get rid of it as soon as possible.

By these means a comparatively pure metal may be obtained from impure materials, and the time necessary for completing a charge is materially lessened. When the metal is sufficiently decarburized, as may be ascertained by chemical test, and by the appearance of a chilled and fractured sample, the charge is tapped into a movable ladle lined with fire-clay, and heated internally by means of a gas-flame, or otherwise, to low redness. Before tapping, rich spiegeleisen or ferro-manganese is broken up into small pieces and distributed over the bottom of the ladle, where it becomes and is kept heated by the continuous action of the flame and heated lining, and thus is readily melted by the stream of liquid metal from the furnace. The quantity of ferro-manganese required depends upon the percentage desired in the metal, and one of the principal advantages realized by this mode of working consists in not allowing the manganese any opportunity of oxidizing, and thus a definite proportion of manganese is insured in the metal produced. At the same time a saving of ferro-manganese is effected, and the process of manufacture is simplified.

Although any suitable apparatus or furnace may be made use of for refining or partially decarburizing the molten metal previous to its being tapped or poured into the ladle, yet I prefer to make use of a regenerative gas-furnace of the construction shown in the accompanying plate of drawings, but do not claim such specially, as it forms the subject of a separate application now pending.

In the accompanying plate of drawings, in which corresponding parts are designated by similar letters, Figure 1 is a partial longitudinal vertical section of the furnace. Fig. 2 is a horizontal longitudinal section, showing the position of the air and gas flues. Fig. 3 is a transverse vertical section of the furnace through the cave A. Fig. 4 is a transverse vertical section through the air-flues. Fig. 5 is a longitudinal elevation.

The regenerative gas-furnace, as shown in the drawings, is built of fire-brick or other suitable refractory material, and consists of the four regenerators with the flues and valves and the heating-chamber, where the metallurgical operations are carried on. The four regenerators are arranged in pairs, and vary in size, the smaller being used for the passage of gas, and the larger for that of air, proportions being in the ratio of two to three approximately. These ratios correspond to the quantities of gas and air required to insure complete combustion in the heating-chamber. The walls of the regenerators are built of fire-brick or other suitable refractory material, closely laid and whitewashed or otherwise made gas-tight, so that no leakage may take place from one chamber to another. These chambers are filled with refractory material, by preference fire-brick, stacked loosely together, and each regenerative chamber has its own separate flue at the base, communicating with the valves, by which the gas and air enter, or the products of combustion pass out, while from the top or side of each regenerator-chamber a flue passes upward and communicates with the heating-chamber, and I prefer to cause the air to enter the heating-chamber above the gas, as by its superior specific gravity, at equal temperatures, it tends to sink through the gas, and thus an intimate mixture and more perfect combustion are obtained.

The entering or issuing gaseous currents pass through valves which are shown at $x$ in Fig. 3.

The heating-chamber where the metallurgical processes are carried on has its roof and sides constructed of highly refractory materials, such as best silica or Dynas bricks. The bed is usually made of sand, but in some cases an oxide of-iron-bottom is preferable.

Below the center of the furnace is an open cave, through which air freely circulates, and rises through openings into the air-space below the melting-chamber and behind the bridges, whereby a perfect cooling of the sides of the melting-chamber is effected. This cave serves, moreover, as a receptacle for any metal which may break through the sides or bottom of the melting-chamber, whence it can be removed at leisure without meanwhile encumbering the ventilating-spaces around the melting-chamber.

On first lighting the furnace, the gas passes through the proper valves and flues into the bottom of the regenerator-chamber $c$, while the air enters through corresponding valves and flues into the regenerator-chamber E, which should be about one-half larger than the gas-regenerator chamber $c$. The currents of gas and air, both quite cold, rise separately through the regenerators $c$ and E, and pass up through the flues or series of flues G G G and F F F F, respectively, into the furnace above, where they meet and are lighted, burning and producing a moderate heat.

Each air-port rises from its regenerator behind the corresponding gas-port, and is projected into the furnace over such gas-port, it being important that the air-port should overlap the gas-port on both sides. Great solidity of brick-work and perfect combustion are thereby attained. The products of combustion pass away through a similar set of flues at the other end of the furnace into the regenerator-chambers $c'$ E', which are not shown by the drawings, but are symmetrically disposed and of like construction to the chambers $c$ E, already described, and thence through properly-constructed flues and valves to the chimney flue. The waste heat is thus deposited in the upper courses of open fire-brick work, filling the chambers $c$ E', and heats them up, while the lower portion and the chimney-flues are quite cool; then, after a suitable interval, the flaps, through which the air and gas are admitted or withdrawn from the furnace are reversed, and the air and gas enter through those regenerator-chambers $c'$ E', which have just been heated by the waste products of combustion, and in passing up through the chequer-work they become heated, and then, on uniting and entering into combustion in the furnace D D, they produce a very high temperature, the waste heat from such higher temperature of combustion heating up the previously cold regenerators $c$ E to a corresponding higher heat. Thus an accumulation of heat and an accession of temperature are obtained step by step, so to speak, until the furnace is as hot as required. The heat is at the same time so thoroughly abstracted from the products of combustion by the regenerators that the chimney-flue remains comparatively cool. The command of the temperature of the furnace and of the quality of the flame is rendered complete by means of gas and air regulating valves and by the chimney-dampers.

One or more doors or openings are provided at such an elevation that the scoria floating on the metallic bath may be run off continuously, or at intervals, during the process of decarburization without discharging the metal itself, and for this purpose these doors or openings should be made low enough to suit the lowest possible surface-level of the metallic bath, and rendered capable of being banked up readily by means of sand or other refractory material to the height required.

Having thus described my invention, I claim, and desire to secure by Letters Patent of the United States—

The process of manufacturing steel by tapping, turning, pouring, or otherwise transferring the charge of a furnace or other apparatus for refining cast-iron into a heated ladle lined with refractory material, and containing ferro-manganese in a solid condition, as and for the purposes described.

In testimony that I claim the foregoing I have hereunto set my hand this 8th day of November, 1876.

C. WILLIAM SIEMENS.

Witnesses:
I. THORPE POTTS,
EDWARD C. INGERSOLL.